(12) United States Patent
Artiuch

(10) Patent No.: US 7,860,677 B2
(45) Date of Patent: Dec. 28, 2010

(54) PORTABLE DIAGNOSTIC ANALYSIS OF GAS METER AND ELECTRONIC CORRECTOR

(75) Inventor: Roman Leon Artiuch, Houston, TX (US)

(73) Assignee: Dresser, Inc., Addison, TX (US)

(*) Notice: Subject to any disclaimer, the term of this patent is extended or adjusted under 35 U.S.C. 154(b) by 163 days.

(21) Appl. No.: 11/734,646

(22) Filed: Apr. 12, 2007

(65) Prior Publication Data
US 2007/0213949 A1 Sep. 13, 2007

Related U.S. Application Data

(63) Continuation of application No. 11/299,020, filed on Dec. 9, 2005, now Pat. No. 7,212,953.

(51) Int. Cl.
*G01F 1/12* (2006.01)

(52) U.S. Cl. .................. 702/100; 702/45; 73/1.16

(58) Field of Classification Search ............. 702/45–48, 702/50, 54, 56, 85, 86, 98, 100; 73/1.16, 73/1.25, 1.26, 1.34, 1.35, 1.59, 861.01–861.03
See application file for complete search history.

(56) References Cited

U.S. PATENT DOCUMENTS

| | | | |
|---|---|---|---|
| 3,537,312 A | 11/1970 | Moore | |
| 3,588,481 A | 6/1971 | Stroman | |
| 4,253,156 A | 2/1981 | Lisle et al. | |
| 4,419,880 A * | 12/1983 | Hanowich | 73/1.22 |
| 4,658,634 A | 4/1987 | Killough et al. | |
| 4,910,519 A | 3/1990 | Duell et al. | |
| 4,953,386 A | 9/1990 | Pearman et al. | |
| 4,965,756 A | 10/1990 | Pearman et al. | |

(Continued)

FOREIGN PATENT DOCUMENTS

CA 2214950 3/1999

(Continued)

OTHER PUBLICATIONS

Mini-Max®, Mini-Max®-AT, Mini-Max®-ATX Product Brochure [online]. Mercury Instruments, Inc. [retrieved on Oct. 27, 2005]. Retrieved from the Internet: <URL: www.mercuryinstruments.com>.

(Continued)

*Primary Examiner*—Manuel L Barbee
(74) *Attorney, Agent, or Firm*—Fish & Richardson P.C.

(57) ABSTRACT

Systems and associated apparatus, methods, and computer program products, relate to a small, portable diagnostic instrument for checking the correct operation of a gas metering system that include a gas meter, an electronic corrector, and a junction there between. Some embodiments may use calibrated sensors to check the operation of a rotary or other positive displacement type gas meter or turbine meter. For example, reference sensors may be temporarily applied to monitor gas temperature and pressure, as well as the motion of a flow-responsive element (e.g., impellers, turbine, or diaphragm) in the gas meter. Measured volume signals from the gas meter system may be compared to reference volume signals determined from the reference sensors to check operation of the junction, and/or the electronic corrector. Some embodiments may detect other failure mechanisms, such as bearing-related problems in the gas meter, for example.

19 Claims, 9 Drawing Sheets

U.S. PATENT DOCUMENTS

| | | | |
|---|---|---|---|
| 5,072,416 A * | 12/1991 | Francisco et al. | 702/100 |
| 5,373,745 A | 12/1994 | Cage | |
| 5,455,781 A * | 10/1995 | Reynal et al. | 702/82 |
| 5,481,924 A | 1/1996 | Sparks et al. | |
| 6,678,624 B2 * | 1/2004 | Normen | 702/100 |
| 6,681,189 B1 * | 1/2004 | Morrison et al. | 702/45 |
| 2004/0200259 A1 * | 10/2004 | Mattar | 73/1.34 |
| 2005/0178189 A1 | 8/2005 | Lenormand et al. | |

FOREIGN PATENT DOCUMENTS

| | | |
|---|---|---|
| DE | 100 22 063 A1 | 11/2001 |

OTHER PUBLICATIONS

RPM Series Rotary Meters Ten-Cycle Proving with RPM-ETC, IM 5770.1 Installation Operation Maintenance. American Meter Company.

EPO Non-Final Office Action in European Application No. 06125733.3, mailed Jul. 20, 2009, 5 pages (includes Extended European Search Report for Application No. 06125733.3, dated Jul. 10, 2009).

* cited by examiner

PORTABLE DIAGNOSTIC ANALYSIS OF GAS METER AND ELECTRONIC CORRECTOR

CROSS-REFERENCE TO RELATED APPLICATIONS

This application claims priority to U.S. application Ser. No. 11/299,020 to Roman Leon Artiuch, titled "Portable Diagnostic Analysis of Gas Meter and Electronic Corrector," filed on Dec. 9, 2005.

TECHNICAL FIELD

Various embodiments may relate generally to a small portable instrument to perform diagnostic testing on a gas meter and an electronic corrector without requiring either the gas meter or the corrector to be taken out of service.

INTRODUCTION

Fluids, such as natural gas, may be transported, distributed, and/or sold to customers through a system of transmission and distribution lines. For purposes such as billing and inventory control, for example, gas metering systems may be installed at various locations along these gas lines. Gas metering systems may provide a measurement of the volume of gas that flows through a particular gas line. Some gas metering systems include a gas meter, an electronic corrector, and a junction there between.

One type of gas meter is a rotary gas meter. In some rotary gas meters, a gas flowing through the meter may cause impellers to rotate. Impeller rotation may be used to determine the volume of gas that has flowed through the meter. Each impeller rotation may indicate that a certain volume of gas has flowed through the meter. To generate a more accurate volume measurement, some gas metering systems may correct an impeller rotation signal to account for temperature or pressure of the gas in the meter.

An electronic corrector may provide, for example, a volume correction function to adjust the measured volume of the gas meter based on temperature and pressure of the gas in the meter. Abjection may connect a gas meter to an electronic corrector. In the junction, an electrical or mechanical signal from the gas meter may be processed for transmission to the electronic corrector.

Thus, performance of a gas metering system may depend on the proper functioning of the gas meter, the electronic corrector, and the junction. Operation of an individual gas meter by itself may be checked using a transfer prover or a bell prover. Operation of a volume corrector may be separately checked using a dedicated measuring device.

SUMMARY

Systems and associated apparatus, methods, and computer program products, relate to a small, portable diagnostic instrument for checking the correct operation of a gas metering system that include a gas meter, an electronic corrector, and a junction there between. Some embodiments may use calibrated sensors to check the operation of a rotary or other positive displacement type gas meter or turbine meter. For example, reference sensors may be temporarily applied to monitor gas temperature and pressure, as well as the motion of a flow-responsive element (e.g., impellers, turbine, or diaphragm) in the gas meter. Measured volume signals from the gas meter system may be compared to reference volume signals determined from the reference sensors to check operation of the junction, and/or the electronic corrector. Some embodiments may detect other failure mechanisms, such as bearing-related problems in the gas meter, for example.

Some embodiments may provide one or more advantages. For example, diagnostic testing of the gas meter and volume corrector may be performed while the gas meter is in service. As such, diagnostic testing may be accomplished without interrupting or bypassing the gas meter installation. In addition, some embodiments of the diagnostic instrument provide all sensors used to perform the diagnostic tests in a portable form, which may resemble a handheld or laptop sized package with associated electrical cabling and/or pneumatic connections for interfacing to the gas meter and volume corrector. Furthermore, embodiments may include a stand-alone diagnostic instrument capable of performing diagnostics on a number of meters that may be installed at various sites in the field. The diagnostic instrument may also provide functions for verifying and/or calibrating portions of the gas meter and/or volume corrector, such as the pressure and temperature sensors. Still further, the diagnostic tester may have the capability to store and retrieve characteristic information for the particular meter, for comparison with historical information. Some embodiments may also update the characteristic of the meter to compensate for detected operating conditions (e.g., degraded bearing).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
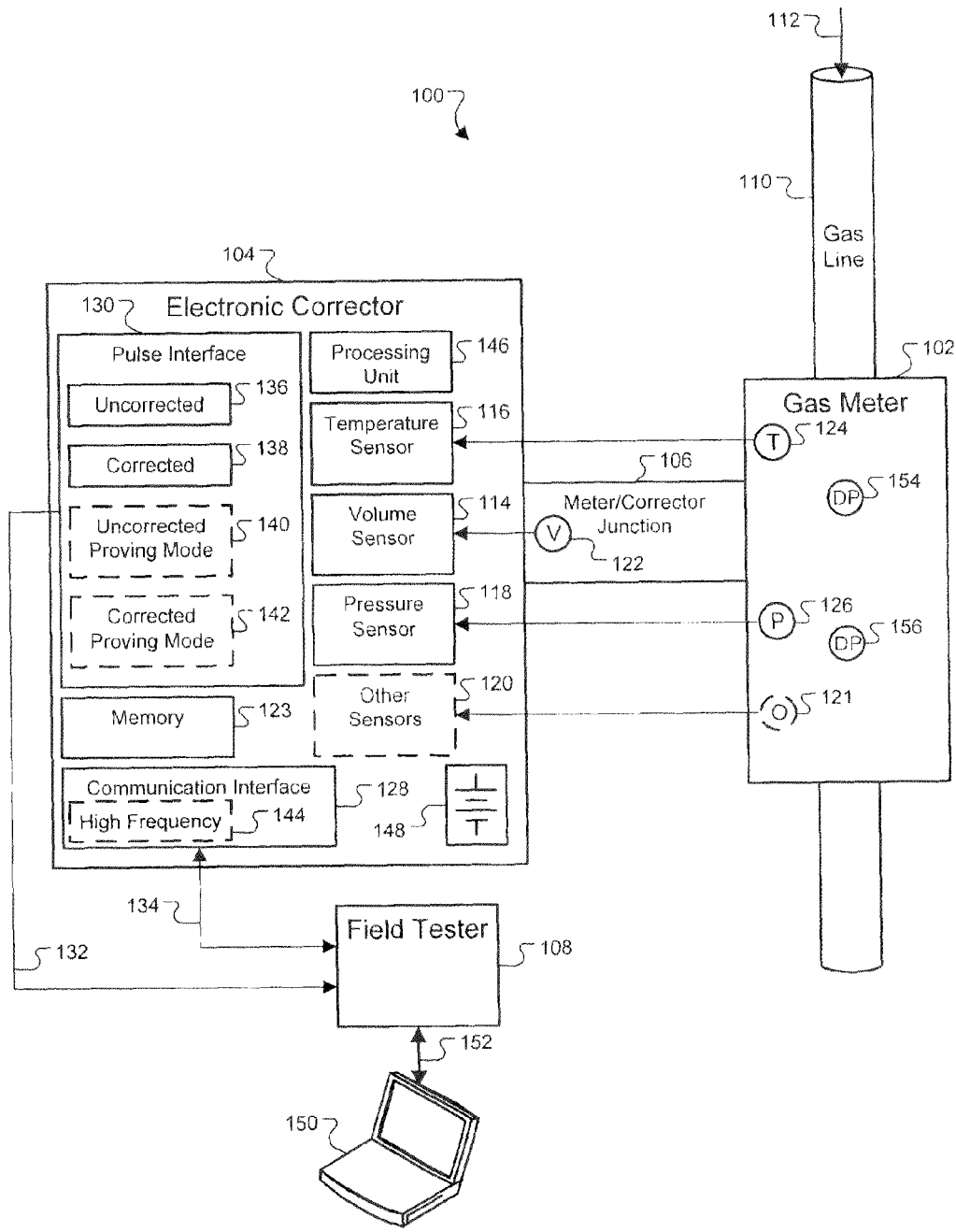
FIG. 1 is a block diagram of an exemplary diagnostic analyzer coupled to a gas metering system containing an electronic corrector and a meter/corrector junction.

FIG. 1 shows an exemplary system 100 for diagnosing the operation of a gas meter 102, an electronic corrector 104, and/or a meter/corrector junction 106 using a portable field tester 108. The gas meter 102 may use an impeller (not shown) to measure the volume of gas flowing through a gas line 110, as indicated by arrow 112. The field tester 108 includes a reference volume sensor (not shown) capable of sensing the rotation of the impeller within the gas meter 102 to determine a reference gas volume. In the system 100, the field tester 108 receives the gas volume measurement determined by the gas meter 102 in the form of a pulse output from the electronic corrector 104. The field tester 108 compares the measured volume to the reference volume to check the operation of the gas meter 102, the electronic corrector 104, and the meter/corrector junction 106.

In this example, the electronic corrector 104 includes a volume sensor 114, a temperature sensor 116, and a pressure sensor 118. In some implementations, the electronic corrector 104 may include other sensors 120, such as an acoustic sensor or a differential pressure sensor. The other sensors 120 may be used to measure changes in a particular characteristic of the gas meter 102 over time, such as the performance of bearings within the gas meter 102 as indicated by a change in the acoustic signature of the gas meter 102, or a change in the differential pressure through the gas meter 102 at one or more flow rates. The other sensors 120 may be coupled to one or more other sensors and/or transducers 121 (e.g., vibrations, strain, orifice sensor) within the gas meter 102.

The gas meter 102 is configured to measure the volume of gas flowing through the gas line 110. In some gas measurement systems, the gas meter 102 may produce an output signal in response motion related to the flow of gas through the meter.

In various examples, some gas meters include at least one impeller or diaphragm to positively displace a volume of a gas from the inlet to the outlet, and the resulting motion generates a measured volume output signal from the meter. In other examples, some gas meters include a turbine that spins at a rate that is related to the volumetric flow rate of the gas. Accordingly, gas meters may provide volume measurement signals based upon some motion (e.g., rotation, translation) of an element that moves in response to gas flow. In rotary gas meters, for example, the flow of gas may cause the flow responsive elements (e.g., impeller, turbine) within the gas meter 102 to rotate. In diaphragm meters, for example, a measured volume signal may be determined by detecting a motion corresponding to gas flowing through the meter. Motion may be detected using optical, magnetic, electrical, acoustic, and/or other detection methods.

In some implementations, each rotation of the impeller may cause the gas meter 102 to generate either an electrical and/or mechanical output that may result in one or more output pulses from the gas meter system. Each output pulse may represent a measured volume that, in some cases, may indicate a certain volume has flowed through the gas meter 102. Although this example refers generally to a rotary gas meter with an impeller, other embodiments may be adapted for use with other types of meters, such as diaphragm meters and/or turbine meters. Similar methods, including optical and acoustic techniques, for example, may be used to generate a reference volume signal in response to rotation (or other position or velocity information) that may be used to generate a reference volume signal.

The gas meter 102 transmits the electrical and/or mechanical output signal to the electronic corrector 104 through the meter/corrector junction 106. In the junction 106, the output signal may be conditioned by a volume element 122. For mechanical output signals, the volume element 122 may include a transducer coupled to a mechanical gearbox, for example. For electrical output signals, the volume element may include a Wiegand sensor, for example, to generate an output signal in response to a magnetic field on the rotating element in the gas meter 102. The output pulse signal from the volume element 122 is sent to the volume sensor 114 in the electronic corrector 104.

In this example, the electronic corrector 104 includes a processing unit 146 that can execute instructions to perform operations to adjust the output pulse signal based on characteristic information (e.g., a curve that relates rotational speed of the meter to transported gas volume error) about the gas meter 102. This characteristic information may be stored in a memory 123 that is operably coupled to the processing unit 146 in the electronic corrector 104. The characteristic information may be used to modify the measured volume signal from the gas meter 102 to compensate for errors between the individual meter and a calibrated or standard response. For example, the electronic corrector 104 may compensate the output signal from the junction 106 based on the stored gas meter characteristic information to yield a linearized volume measurement. A measured volume signal that has only been adjusted based on the gas meter characteristic may be referred to herein as an uncorrected measured volume signal.

The electronic corrector 104 may also provide volume correction functionality to adjust the uncorrected measured volume signal based on gas temperature and/or pressure within the gas line 110. The volume of gas flowing through the gas meter 102 may be determined from a number of rotations in the gas meter 102 if the temperature and/or pressure in the gas meter 102. After correction for temperature and pressure, the electronic corrector 104 may output a signal that may be referred to herein as a corrected volume signal. In this example, the electronic corrector 104 is coupled to a temperature transducer 124 and a pressure transducer 126 to measure the temperature and pressure, respectively, within the line 110. The electronic corrector 104 receives the temperature and pressure measurements through the temperature sensor 116 and the pressure sensor 118, respectively. The electronic corrector 104 may use the temperature and/or pressure measurements to correct the number of output pulses according to one or more defined correction algorithms.

In some implementations, the electronic corrector 104 may modify the uncorrected pulse output signal based on gas temperature and pressure. The electronic corrector 104 may output the modified uncorrected output pulse signal as a corrected measured volume signal output pulse signal format. The electronic corrector 104 may output the uncorrected and/or corrected output pulse signals with a pulse width formatted according to a selected mode. In a normal mode, for example, the output may be of a standard pulse width, which may be a default pulse width used by the electronic corrector 104. In a proving mode, for example, the output may be of a short pulse width, such as about 20 milliseconds. A shorter pulse width may allow, for example, the field tester 108 to measure a higher maximum rate of flow. In some implementations, an integrated meter/corrector in proving mode may output pulses that have a pulse width of about 20 milliseconds. This may enable the diagnostic testing of the gas meter 102, the electronic corrector 104, and the meter/corrector junction 106 to be completed in a shorter time than if the test were performed using normal mode pulses, which may have a pulse width of 400 milliseconds, for example. In some cases, this may result in the normal mode test taking 20 times longer to complete than the proving mode test for the same test volume.

In various implementations, corrected and/or uncorrected output pulses may be generated by a processing unit (e.g., microprocessor) in an electronic corrector. Output pulses in normal mode may be generated at a relatively low frequency to conserve battery charge, for example. In one example, output pulses may be generated only at convenient times for the processing unit, so as to avoid unnecessary wake-ups, for example, just for the processor to send a single output pulse.

In other examples, output pulses generated in a proving mode may be designed for performing occasional accuracy testing. Output pulses in proving mode could be generated at high frequencies and at arbitrary times, and the pulses could have a relatively small width (e.g. 20 ms). By comparison, pulse widths in normal mode may be up to at least 400 ms or more, for example. Accordingly, short proving mode pulses may facilitate testing at high gas flow rates.

Another output pulse format available from the electronic corrector 104 in this example is the high frequency (HF) pulse output signal. In some integrated meter and corrector systems, the electronic corrector 104 may receive a pulse output signal from a Wiegand sensor, and the signal may directly correspond to rotation of the impeller within the gas meter 102. The received signal may directly, or with some filtering and/or amplification, form the HF output signal. For example, the HF signal may provide one or more pulses per revolution of an impeller.

Using a communications interface 128, the electronic corrector 104 may be configured to output the one or more output pulse signal formats over a pulse interface 130 and/or the communications interface 128, as represented by arrows 132 and 134, respectively. The output pulse signal formats may include uncorrected pulses 136 and corrected pulses 138. In addition, some electronic correctors may output corrected pulses in proving mode 140 and uncorrected pulses in proving mode 142 over the pulse interface 130 or the communications interface 128. The electronic corrector 104 may also output high frequency pulse signals 144 over the communications interface 128, such as in the case of an integrated meter/corrector. In some embodiments, the electronic corrector 104 may output the high frequency pulse signal and/or other signal format over the pulse interface 130 and/or the communication interface 128.

A processing unit 146 may perform the meter characteristic and/or volume correction operations of the electronic corrector 104. The processing unit 146 may include digital and/or analog circuitry, and may include programmable devices containing executable instructions (e.g., software code modules). A power source, such as a battery 148, may provide power to the processing unit 146.

A user may interact with the field tester 108 through a user interface. In one embodiment, the field tester 108 includes a user interface. In some embodiments, a computer, such as a portable computer 150, in communication with the field tester 108, as represented by data communication line 152, may provide a user interface to the field tester 108.

The field tester 108 may make reference measurements of the temperature, the pressure in the line 110, and/or other characteristics of the gas meter 102 using a differential pressure (DP) inlet port 154 and a DP outlet port 156. The DP ports 154 and 156 allow reference sensors to be placed in fluid communication with the gas line 110 at the inlet and outlet of the gas meter 102. As will be described in further detail with reference to FIGS. 2A-B, a temperature transducer or a pressure transducer, for example, may be placed in either or both of the DP ports 154 and 156. Alternatively, a transducer may be located exterior to the gas meter 102, such as within the field tester 108, and still be in fluid communication with the gas meter 102 via a line coupled to the DP ports 154 and 156. The connections between the field tester 108 and the DP ports 154 and 156 may be provided by a device commercially available, such as the Pete's Plug® Model #100, which is commercially available from Peterson Equipment Company, Incorporated of McKinney, Tex. In addition, the DP ports 154 and 156 may be used to measure other properties, such as the differential pressure across the impeller.

Figure 2A:
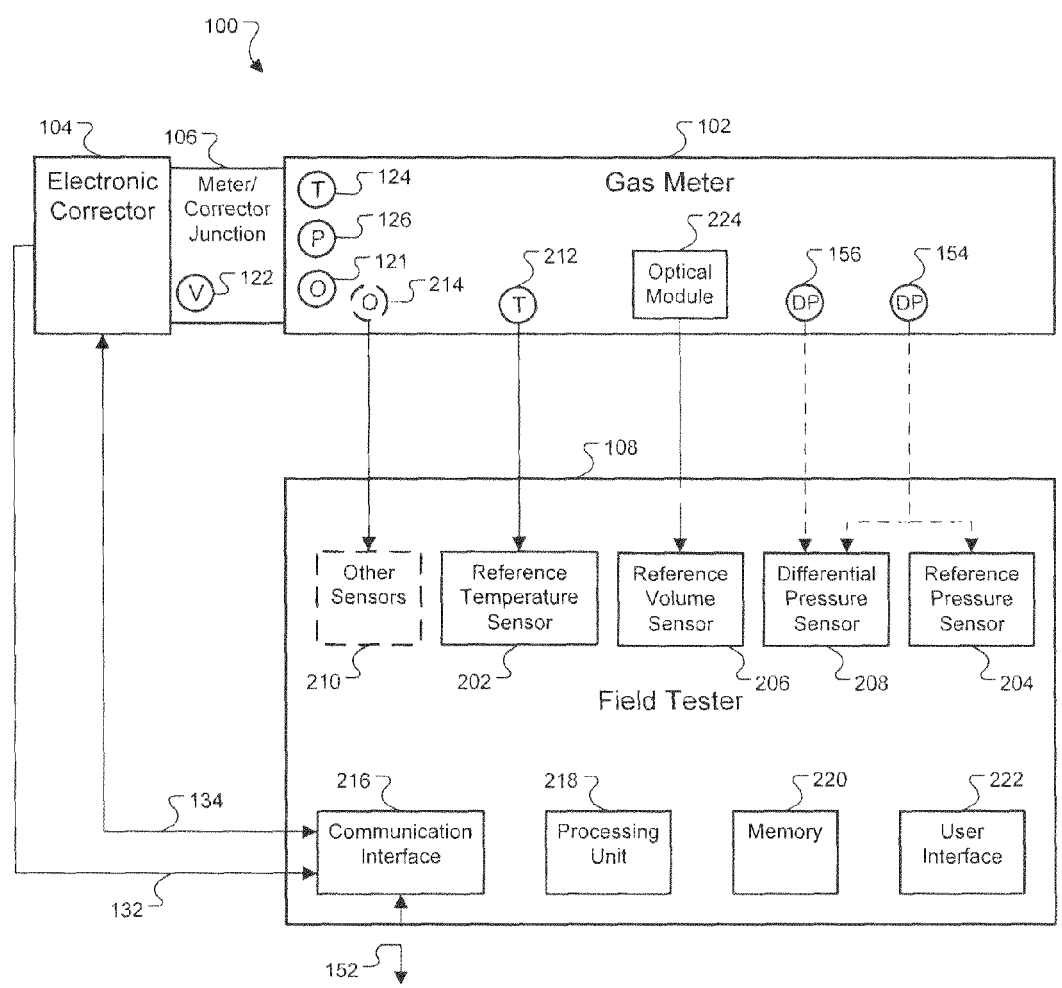
FIG. 2A is a block diagram of an exemplary diagnostic tester including an exemplary embodiment of a reference volume sensor.
Figure 2B:
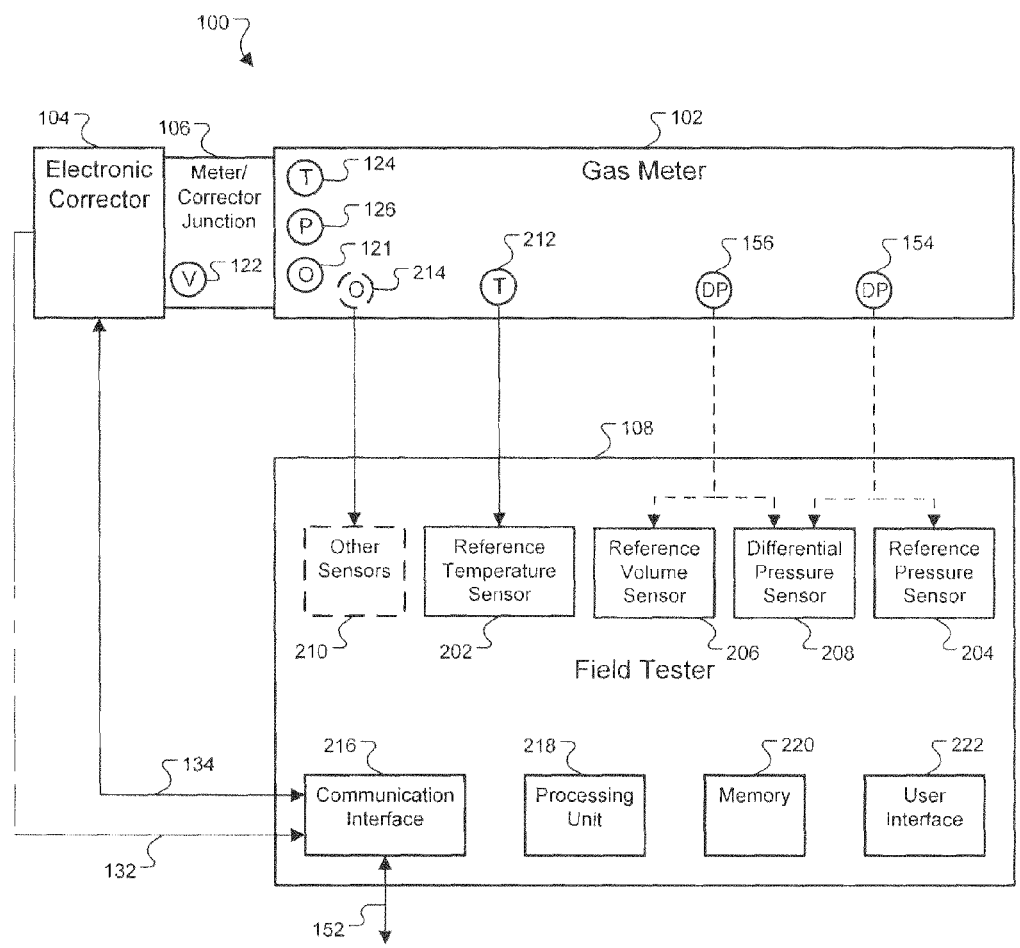
FIG. 2B is a block diagram of another exemplary diagnostic tester including another exemplary embodiment of a reference volume sensor.

FIGS. 2A-2B represent two exemplary implementations of the system 100. FIG. 2A shows an exemplary embodiment of the field tester 108 including an optical reference volume sensor. FIG. 2B shows an exemplary embodiment of the field tester 108 including a differential pressure reference volume sensor. The systems 100 of FIGS. 2A-2B both include a reference temperature sensor 202, a reference pressure sensor 204, a reference volume sensor 206, and a reference differential pressure sensor 208. These reference sensors may provide reference volume measurement signals that may be compared to the actual volume measurements determined using the gas meter 102, electronic corrector 104, and the meter/corrector junction 106, to diagnose and check the operation of the electronic corrector 104 and the meter/corrector junction 106. The systems 100 may also include other sensors 210, such as an acoustic sensor that may measure flow vibrations in the gas meter, wherein such vibrations may be analyzed to determine the condition of the gas meter 102.

For example, in the case of an integrated meter/corrector, the high frequency pulse signal 144 may be compared to the reference volume signal to test the meter/corrector junction 106. The uncorrected pulse signal 136 may be compared to the reference volume signal, adjusted based on the characteristic of the gas meter 102, to test the electronic corrector 104 and the meter/corrector junction 106. The corrected pulse signal 138 may be compared to the adjusted reference volume signal, corrected based on the reference temperature and the reference pressure, to test the electronic corrector 104, the meter/corrector junction 106, the temperature sensor 116, and the pressure sensor 118.

In some embodiments, the reference sensors 204, 206, 208, and 202 may be in fluid communication with the transducers 121, 124, 126 located in the gas meter 102. The reference pressure sensors 204, 206, 208 may be located in the field tester 108, or one or more of these sensors may be disposed in or near the differential ports 154, 156. For example, the reference temperature sensor 202 may be coupled to a temperature transducer 212 disposed in the gas meter 102. In some implementations, the temperature transducer 212 has access to the gas meter 102 via one of the DP ports 154 and 156. In embodiments, the reference pressure sensor 204 may measure the pressure upstream or downstream of the impeller. The reference pressure sensor 204 may have access to the gas meter 102 upstream of the impeller using the DP port 154. The reference DP sensor 208 measures the differential pressure across the impeller using the DP ports 154 and 156. The other sensors 210 may use transducers 214 to detect or measure other properties of the gas meter 102, such as acoustical and/or vibrational energy being generated in the gas meter 102 during operation.

The field tester 108 may communicate with the electronic corrector 104 and the portable computer 150 using a communications interface 216. A processing unit 218 may perform operations, such as adjusting, correcting, and comparing output pulse signals. The field tester 108 may store test parameters and results in a memory 220. A user may interact with the field tester 108 via a user interface 222. The field tester 108 may receive test initiation inputs via the user interface 222. In addition, the field tester 108 may present results of tests to a user via the user interface 222. An exemplary display of test results will be described in further detail with reference to FIG. 3.

FIGS. 2A-B present two examples of systems in which a gas meter, electronic corrector, and meter/corrector junction on a live gas line that is currently in service may be tested. The reference volume sensor 206 of FIG. 2A determines the reference volume signal using an optical module 224. In one embodiment, the optical module 224 senses rotation of the impeller visually, for example, by detecting light variations on dark and light markings on a shaft coupled to the impeller. In some implementations, the impeller surfaces may have contrasting colors or other indicia that allow the optical module 224 to sense rotations and/or translations of members that are coupled to a flow responsive element in the meter. In the embodiment of FIG. 2B, the reference volume sensor 206 determines the reference volume signal using a dynamic pressure measurement. A dynamic pressure sensor, such as is commercially available from PCB Piezotronics, Incorporated of Depew, N.Y. may be used. Small changes (e.g., dynamic changes) in the pressure may correspond to impeller rotations that can be translated into a reference volume signal. The dynamic pressure may be measured via the DP port 156 or the DP port 154. The reference volume signal may then be used as described above to check the operation of the electronic corrector 104 and the meter/corrector junction 106.

In addition to tests using the reference volume signal, the field tester 108 may use other measurements, such as the differential pressure measurement made by the differential pressure sensor 208 and the other sensors 210, respectively, to check the operation of the gas meter itself, and/or to modify the gas meter characteristic.

For example, bearing that support impellers within the gas meter 102 may develop increased friction over time due to decreased lubrication or worn bearing surfaces. If the impellers within the gas meter 102 move less freely than they moved when the gas meter characteristic correction was generated, then more gas may be flowing through the gas meter 102 than is indicated by the measured volume signal. In one embodiment, the increased friction may be detected as an elevated differential pressure across the impellers. In another embodiment, the increased friction may be detected using an accelerometer or strain sensor to identify increased energy at a frequency related to the rotational frequency of the rotating element in the meter. A spectral analysis may be accomplished, for example, using Fourier analysis of a sampled signal, or using a voltage controlled oscillator and a mixer, for example, to selectively tune and measure the frequency content associated with bearing-related vibration. A correction may be applied if the differential pressure or the vibration deviates from an expected value at the determined flow rate. The correction may be used to generate an updated characteristic for the gas meter 102. The field tester 108 may update the electronic corrector 104 by sending the new characteristic correction to the electronic corrector 104 to be stored in the memory 123.

Figure 3:
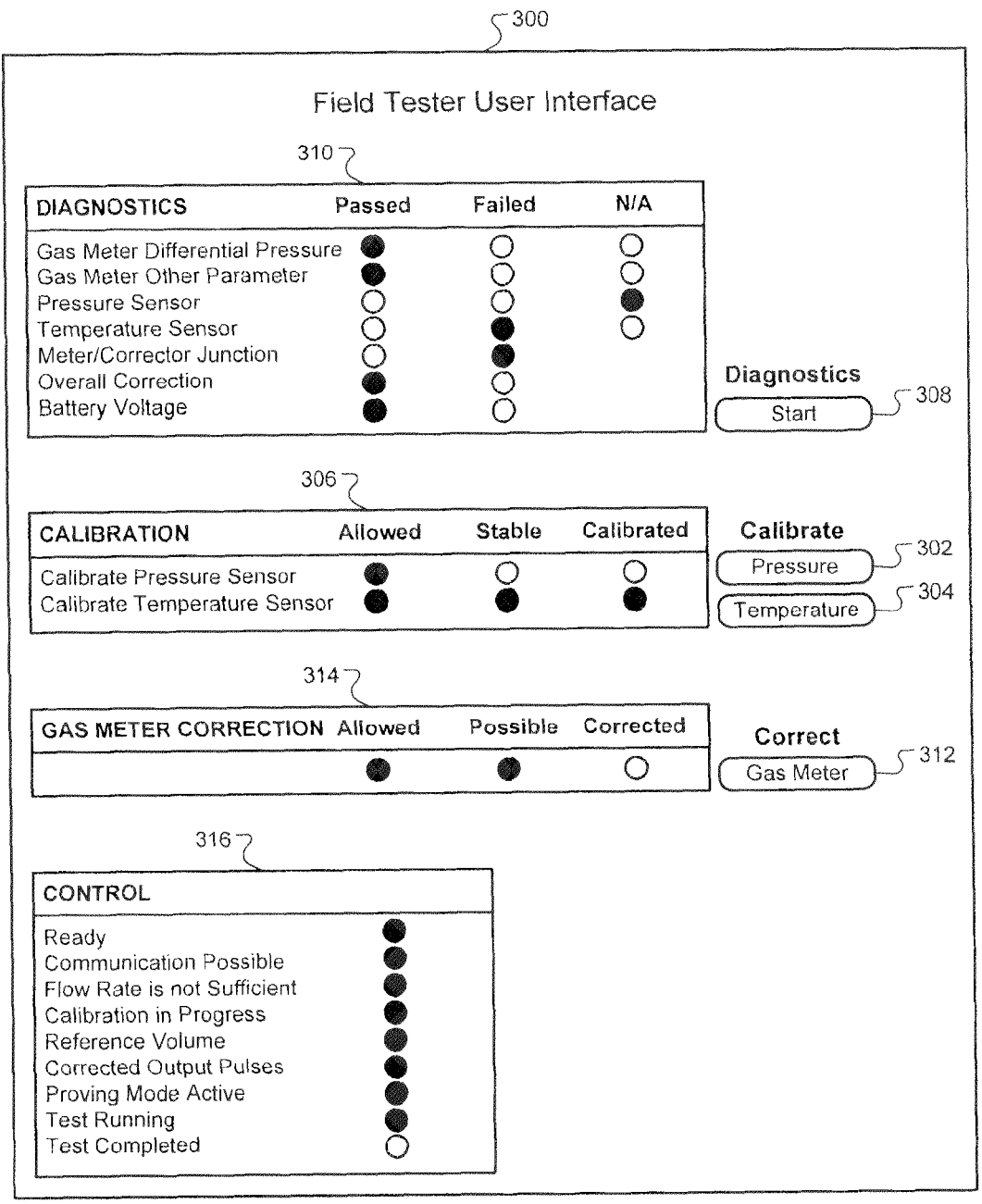
FIG. 3 is an exemplary graphical user interface for the diagnostic analyzer.

FIG. 3 shows an exemplary graphical user interface (GUI) 300 for initiating and viewing results of tests of the electronic corrector 104 and the meter/corrector junction 106 in a gas metering system. The field tester 108 may send the GUI 300 for display on a local display device (e.g., LCD), or an external display device, such as the display provided on the portable computer 150.

The GUI 300 includes input controls 302 and 304 that allow a user to initiate calibration of the temperature sensor 116 and the pressure sensor 118, respectively, using the field tester 108. A calibration results area 306 presents results of the temperature and pressure calibration to the user. The area 306 indicates whether the temperature and/or pressure sensor calibration is allowed based on the hardware within the electronic corrector 104. The area 306 indicates whether the temperature and/or pressure have stabilized to an extent that the calibration may be performed. The area 306 indicates whether the temperature and/or pressure sensor calibration succeeded.

An input control 308 allows the user to initiate diagnostic testing of the gas meter 102, the electronic corrector 104, and the meter/corrector junction 106. A diagnostic results area 310 presents results of the diagnostic tests. The area 310 may indicate whether a test is applicable or not and whether the test passed or failed. For example, an error between the reference temperature and measured temperature may be compared to a temperature error threshold to determine success or failure of the temperature sensor 116. Similarly, an error between the reference pressure and measured pressure may be compared to a pressure error threshold to determine success or failure of the pressure sensor 118. The voltage level of the battery 148 may be compared to a voltage threshold to determine success or failure of the battery 148. The differential pressure may be compared to a differential pressure threshold to determine success or failure of the gas meter 102. Other parameters, such as sound produced by the gas meter 102, may be compared to a threshold to determine success or failure of the gas meter 102. The high frequency pulse signal may be compared to the reference volume signal to determine success or failure of the meter/corrector junction 106. The corrected pulse signal may be compared to the reference volume signal, adjusted based on the gas meter characteristics and corrected based on the reference temperature and pressure, to determine the overall success or failure of the electronic corrector 104 and the meter/corrector junction 106.

An input control 312 allows the user to initiate correction of the gas meter characteristic used by the electronic corrector 104. A gas meter correction results area 314 presents results of the gas meter characteristic calibration. The area 314 indicates whether gas meter characteristic correction is allowed by the electronic corrector 104. The area 314 also indicates whether test conditions make calibration possible and if the calibration was successful.

A control area 316 indicates the status of the system 100. The area 316 indicates whether or not the field tester 108 is ready for testing, whether or not communication is possible between the field tester 108 and the electronic corrector 104, whether or not the current flow rate through the gas meter 102 is sufficient to enable testing of the electronic corrector 104 and the meter/corrector junction 106, whether or not the field tester 108 is currently performing a calibration, whether or not the electronic corrector 104 is in proving mode, whether or not the field tester 108 is currently running a diagnostic test, and whether or not the field tester 108 has completed the diagnostic tests. In some implementations, the indicators described above may present more information than success or failure, such as the actual value for a test in numerical or graph form. The area 316 also indicates the rate of the reference volume signal and the corrected output pulse signal, such as by blinking a light, where each flash of the light may correspond to a number of rotations of the impellers or a particular volume of gas. In some implementations, the volume indicators above may present more information, such as a bar graph that shows the lowest, highest, and current flow rates.

Figure 4:
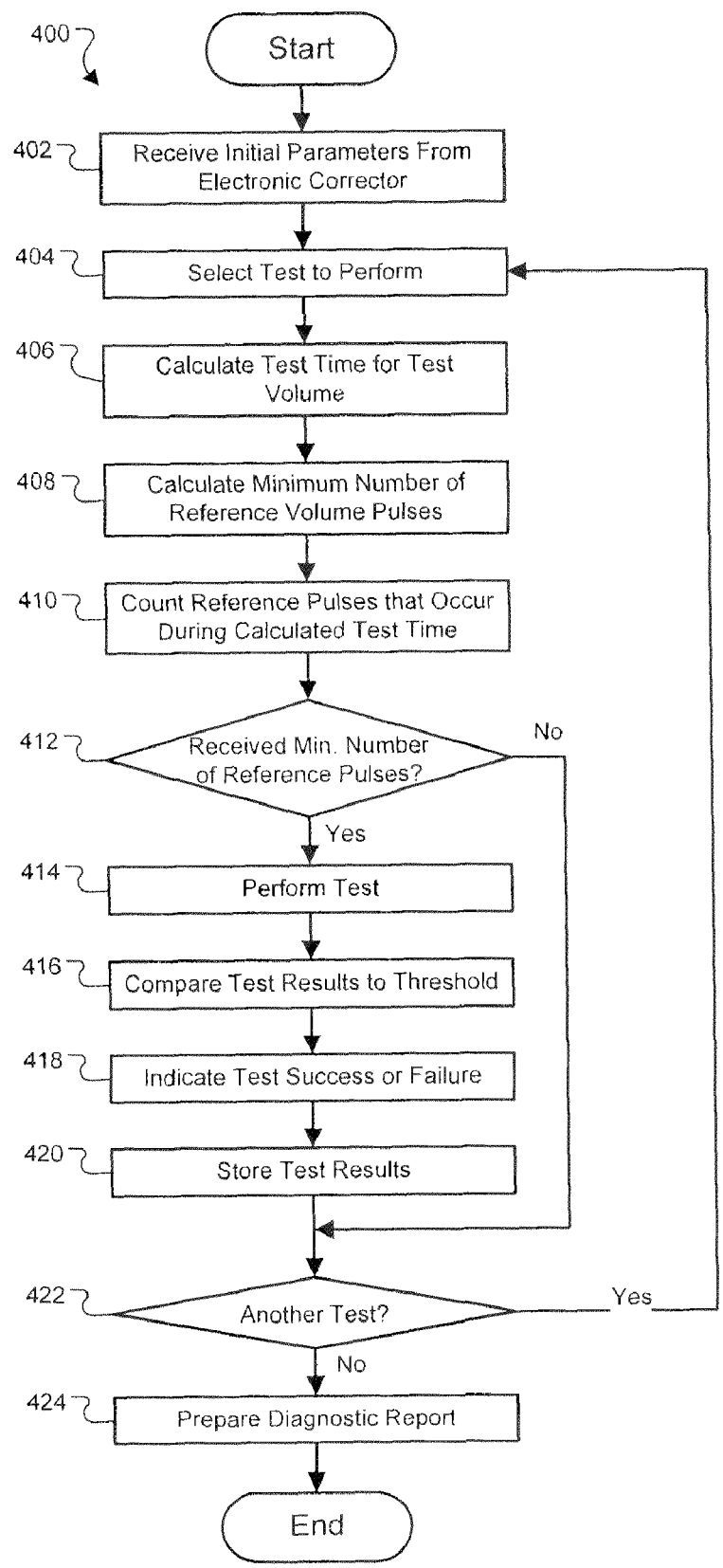
FIG. 4 is a flow chart that illustrates an exemplary method for diagnosing operation of a gas meter, an electronic corrector, and a meter/corrector junction.

FIG. 4 shows a flow chart that illustrates an exemplary method 400 of operations for running diagnostic tests of the gas meter 102, the electronic corrector 104, and the meter/corrector junction 106. The method 400 includes operations that may be performed generally by the field tester 108. The operations may be performed under the control, supervision, and/or monitoring of the portable computer 150. Some or all of the operations may be performed by one or more processors executing instructions tangibly embodied in a signal. The processing may be implemented using analog and/or digital hardware or techniques, either alone or in cooperation with one or more processors executing instructions.

The exemplary method 400 begins at step 402, where the field tester 108 receives initial parameters from the electronic corrector 104. For example, the electronic corrector 104 may provide information that indicates whether gas meter characteristic correction, temperature measurement, pressure measurement, differential pressure measurement, or other measurements are available. The information above may be used to indicate on the GUI 300 if a particular test is allowed. The electronic corrector 104 may also provide the size, type, and serial number of the gas meter 102.

At step 404, the field tester 108 selects a diagnostic test for checking the operation of the gas metering system. In one example, the selected test may be selected from a predefined sequence of tests. In another example, a user may select one or more tests or battery of tests. The diagnostic tests may include tests of the pressure sensor 118, the temperature sensor 116, the differential pressure, the high frequency pulse signal, the uncorrected pulse signal, and the corrected pulse signal. The differential pressure test may check the operation of the gas meter 102. The high frequency pulse signal test may check the operation of the meter/corrector junction 106. The uncorrected pulse signal test may check the operation of the gas meter characteristic correction of the output pulses performed by the electronic corrector 104. The corrected pulse signal test may check the operation of the temperature and pressure correction of the uncorrected pulse signal performed by the electronic corrector 106. In one embodiment, the test selection includes selection of a test volume, which may be predefined or user defined, for example.

The field tester 108 calculates, at step 406, a test time based on a test volume for the selected test. In some embodiments, the test volume may be predefined or specified by the user. In some embodiments, the test volume may depend from a minimum flow rate for a particular meter type and size, and/or may depend upon the selected test. The test time is the amount of time expected to have elapsed when an amount of gas equal to the test volume has passed through the gas meter 102.

The field tester 108 calculates, at step 408, a minimum number of reference pulses. The minimum number of reference pulses may correspond to the minimum acceptable flow rate that has been identified as sufficient to perform the selected test.

At step 410, the field tester 108 counts the number of reference volume pulses received during the calculated test time. The reference volume signal may be generated using the optical module 224 of FIG. 2A or the dynamic pressure sensor of FIG. 2B.

At step 412, the field tester 108 checks whether the minimum number of reference pulses has been received during the calculated test time. If the minimum number of reference pulses have not been received, then step 422, which will be described in further detail below, may be performed. Step 422 may further include determining whether the number of reference pulses that were received is sufficient for performing a different type of test; if it is sufficient, then the different type of test may be selected at step 404. The field tester 108 may activate an indicator on the GUI 300 to notify the user that the flow rate is not sufficient. In an alternative embodiment, the method 400 ends after step 410 if the minimum number of reference pulses is not received during the calculated test time.

If the minimum number of reference pulses is received at step 412, then the field tester 108 performs, at step 414, the selected diagnostic test. The individual steps of the diagnostic tests mentioned above will be described with reference to FIGS. 5A-G.

The field tester 108 compares the results of the selected diagnostic test to a threshold for the results of the selected diagnostic test, at step 416. The threshold may determine success or failure of the selected diagnostic test. The field tester 108 may present the test results in the GUI 300.

The field tester 108 indicates, at step 418, the success or failure of the selected test. For example, the field tester 108 may activate an indicator light on the GUI 300 indicating that the test passed or failed.

At step 420, the field tester 108 stores the results of the selected test. The results of the test may be output to another device, such as the portable computer 150, or the results may be used as a basis for a future testing, monitoring, and/or maintenance program, which may record and monitor changes over time in the differential pressure across the meter or the acoustic signature of the meter, for example.

If there is another diagnostic test to perform, at step 422, then the field tester 108 selects another test to perform at step 404. If there are no more tests to perform, then the field tester 108 prepares a diagnostic report at step 424. The diagnostic report may be for example, stored in a data storage device, sent as encoded data in a message transmitted over a wired or wireless communication interface, and/or presented to a user via the user interface 222 or via a user interface provided by another device, such as the portable computer 150.

FIGS. 5A-G show flow charts that illustrate exemplary methods 414 for testing one or more portions of a gas metering system. The methods 414 include operations that may be performed generally by the field tester 108. The operations may be performed under the control, supervision, and/or monitoring of the portable computer 150, for example. Some or all of the operations may be performed by one or more processors executing instructions tangibly embodied in a signal. The processing may be implemented using analog and/or digital hardware or techniques, either alone or in cooperation with one or more processors executing instructions.

Figure 5A:
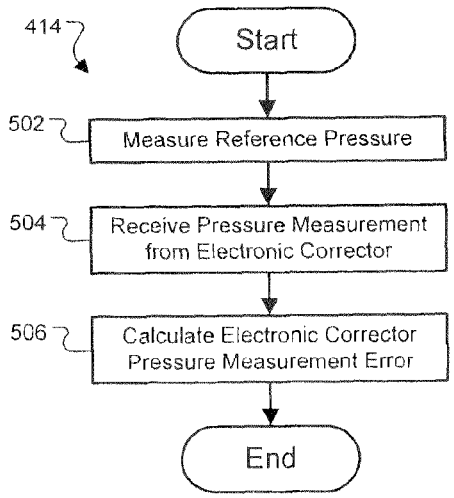
FIGS. 5A-G are flow charts that illustrate exemplary method performed by diagnostic tests of a gas meter, an electronic corrector, and a meter/corrector junction.

FIG. 5A shows a flow chart illustrating an exemplary method 414 for checking the operation of the pressure sensor 116 of the electronic corrector 104. The method 414 begins in step 502 where the field tester 108 measures a reference pressure. The field tester 108 may use the reference pressure sensor 204 to measure the reference pressure.

The field tester 108 receives, at step 504, a pressure measurement from the electronic corrector 104. The electronic corrector 104 determines the pressure measurement using the pressure sensor 118.

The field tester 108 calculates, at step 506, an error between the measured pressure and the reference pressure. The error may be compared to a predetermined or user specified threshold in step 416 of the method 400.

Figure 5B:
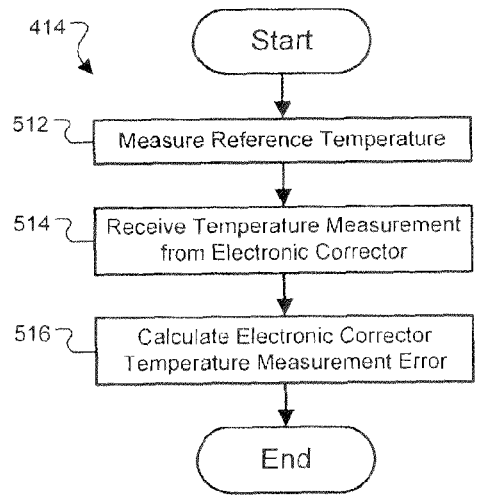

FIG. 5B shows a flow chart illustrating an exemplary method 414 for checking the operation of the temperature sensor 116 of the electronic corrector 104. The method 414 begins in step 512 where the field tester 108 measures a reference temperature. The field tester 108 may use the reference temperature sensor 202 to measure the reference temperature.

The field tester 108 receives, at step 514, a temperature measurement from the electronic corrector 104. The electronic corrector 104 determines the temperature measurement using the temperature sensor 116.

The field tester 108 calculates, at step 516, an error between the measured temperature and the reference temperature. The error may be compared to a predetermined or user specified threshold in step 416 of the method 400.

Figure 5C:
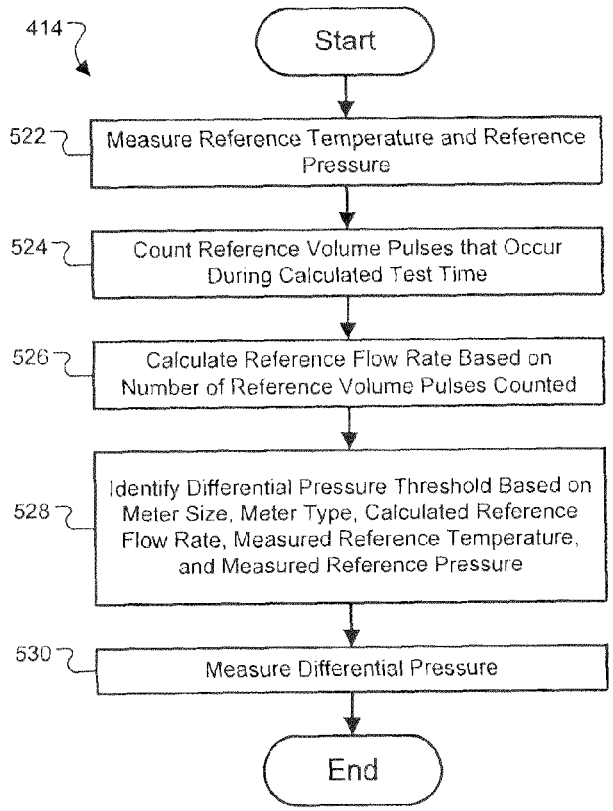

FIG. 5C shows a flow chart illustrating an exemplary method 414 for checking the operation of the gas meter 102 based on the differential pressure measured across its impeller. The method 414 begins in step 522 where the field tester 108 measures a reference temperature and a reference pressure of the gas within the gas meter 102. The field tester 108 will use the reference temperature and pressure below to calculate the differential pressure threshold. The field tester 108 may use a reference temperature and/or pressure measurement made during a previously performed test.

At step 524, the field tester 108 counts the number of reference volume pulses received during the calculated test time, determined at step 406 of method 400. The reference volume signal may be generated using the optical module 224 of FIG. 2A or the dynamic pressure sensor of FIG. 2B. At step 526, the field tester 108 calculates a reference flow rate based on the number of reference pulses counted.

The field tester 108 identifies, at step 528, a differential pressure threshold based on the calculated flow rate, the measured reference temperature, the measured reference pressure, the type of the gas meter 102, and the size of the gas meter 102. At step 530, the field tester 108 measures the differential pressure. The field tester 108 may use the differential pressure sensor 208 to measure the differential pressure. The field tester 108 compares the measured differential pressure to the differential pressure threshold in step 416 of method 400.

Figure 5D:
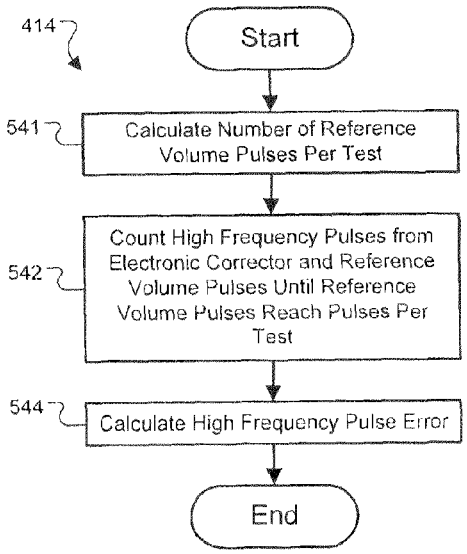

FIG. 5D shows a flow chart illustrating an exemplary method 414 for checking the operation of the meter/corrector junction 106 using the high frequency pulse signal from the electronic corrector 104 and the reference volume signal from the field tester 108. The method 414 begins in step 541 where the field tester 108 calculates a number of reference volume pulses per test. The number of reference volume pulses per test may be based on a desired volume of gas flowing through the gas meter 102.

At step 542, the field tester 108 counts high frequency pulses from the electronic corrector 104 and reference volume pulses from the reference volume sensor 206 until the number of reference volume pulses reaches the number of pulses per test At step 544, the field tester 108 calculates an error between the high frequency pulse signal and the reference volume signal. The field tester 108 compares the calculated error to a high frequency pulse error threshold in step 416 of method 400. The threshold may be predefined or specified by a user.

Figure 5E:
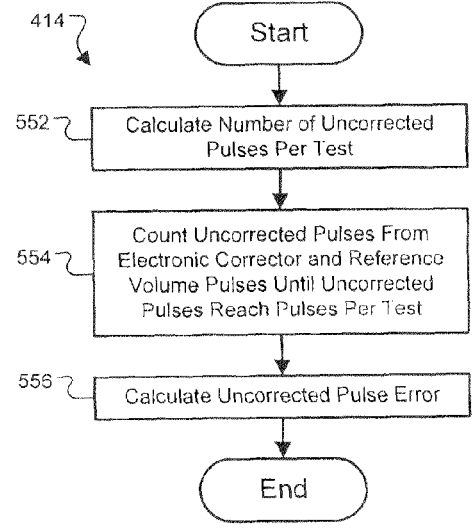

FIG. 5E shows a flow chart illustrating an exemplary method 414 for checking the operation of the electronic corrector 104 using the uncorrected pulse signal, from the electronic corrector 104, and the reference volume signal, from the field tester 108, adjusted for the characteristics of the gas meter 102. The method 414 begins in step 552 where the field tester 108 calculates a number of uncorrected pulses per test. The number of uncorrected pulses per test may be based on a desired volume of gas flowing through the gas meter 102.

The field tester 108 counts, at step 554, uncorrected pulses from the electronic corrector 104 and reference volume pulses from the reference volume sensor 206 until the number of uncorrected pulses reaches the number of pulses per test.

At step 556, the field tester 108 calculates an error between the number of uncorrected pulses counted and the number of reference pulses counted. The field tester 108 compares the calculated error to an uncorrected pulse error threshold in step 416 of method 400. The threshold may be predefined or specified by a user.

Figure 5F:
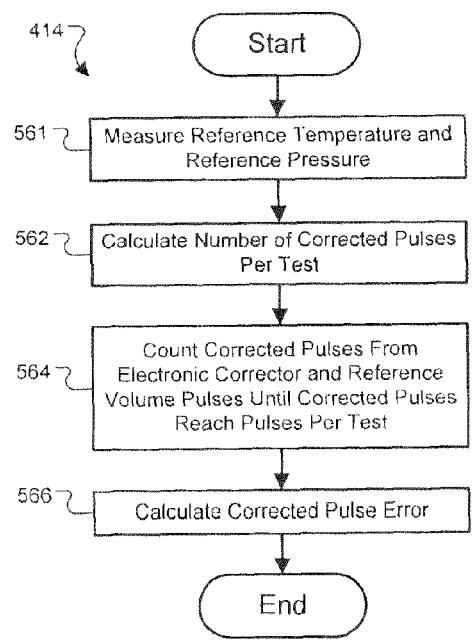

FIG. 5F shows a flow chart illustrating an exemplary method 414 for checking the operation of the electronic corrector 104 using the corrected pulse signal, from the electronic corrector 104, and the reference volume signal, from the field tester 108, adjusted for the characteristics of the gas meter 102 and corrected based on the temperature and pressure. The method 414 begins in step 561 where the field tester 108 measures a reference temperature and a reference pressure.

At step 562, the field tester 108 calculates a number of corrected pulses per test. The number of corrected pulses per test may be based on a desired volume of gas flowing through the gas meter 102.

The field tester 108 counts, at step 564, corrected pulses from the electronic corrector 104 and reference volume pulses from the reference volume sensor 206 until the number of corrected pulses reaches the number of pulses per test. In addition, the field tester 108 corrects the number of reference pulses based on the reference temperature and reference pressure measurements.

At step 566, the field tester 108 calculates an error between the number of corrected pulses counted and the number of reference pulses counted. The field tester 108 compares the calculated error to a corrected pulse error threshold in step 416 of method 400. The threshold may be predefined or specified by a user.

Figure 5G:
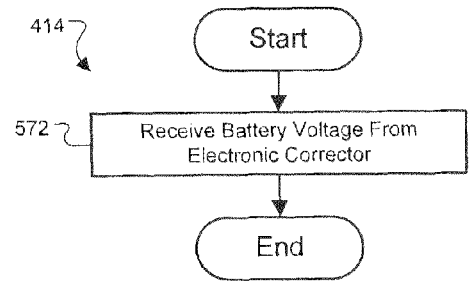

FIG. 5G shows a flow chart illustrating an exemplary method 414 for checking the operation of the battery 148 within the electronic corrector 104. The method 414 includes step 562, where the field tester 108 receives, from the electronic corrector 104, a voltage level of the battery 148. The field tester 108 compares the voltage level of the battery 148 to a battery voltage level threshold in step 416 of method 400. The threshold may be predefined or specified by a user.

Figure 6A:
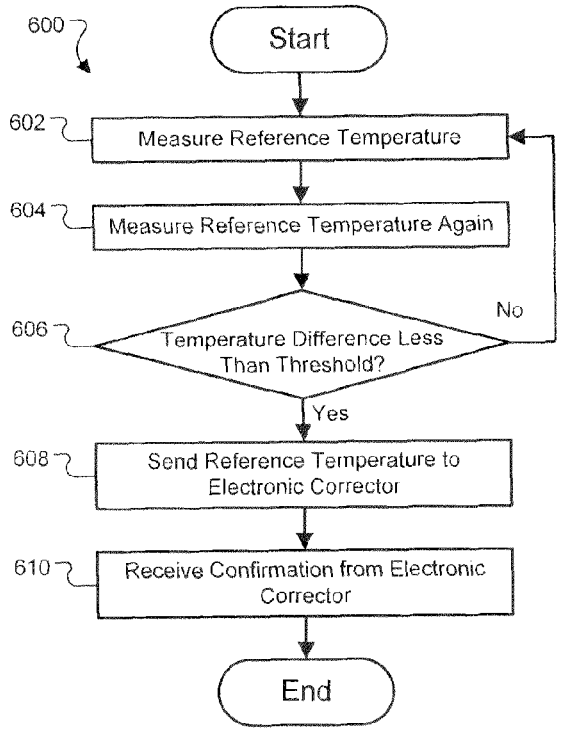
FIGS. 6A-B are flow charts that illustrate exemplary method for calibrating temperature and pressure measurement, respectively, of an electronic corrector.
Figure 6B:
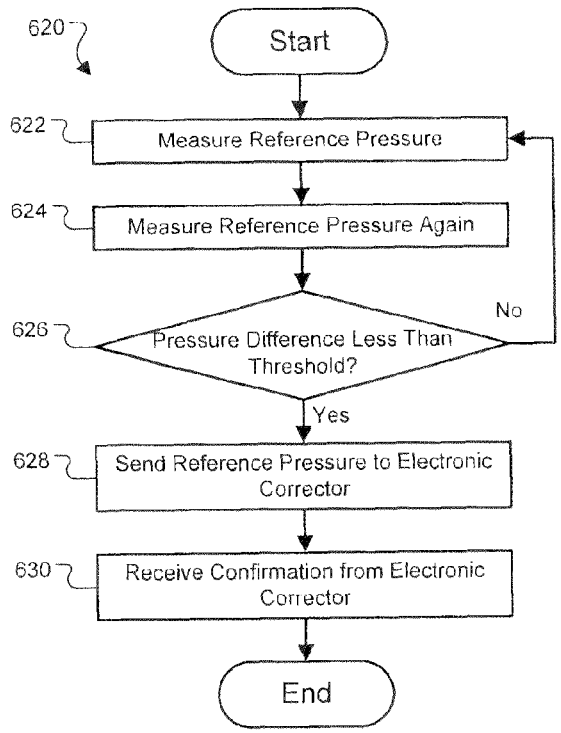

FIGS. 6A-B show flow charts illustrating exemplary methods 600 and 620 for calibrating the temperature sensor 116 and the pressure sensor 118, respectively, of the electronic corrector 104. The methods 600 and 620 include operations that may be performed generally by the field tester 108. The operations may be performed under the control, supervision, and/or monitoring of the portable computer 150. Some or all of the operations may be performed by one or more processors executing instructions tangibly embodied in a signal. The processing may be implemented using analog and/or digital hardware or techniques, either alone or in cooperation with one or more processors executing instructions.

Referring to FIG. 6A, the method 600 begins at step 602 where the field tester 108 measures the reference temperature. The field tester 108 may use the reference temperature sensor 202 to measure the reference temperature.

The field tester 108 measures the reference temperature again, at step 604. If, at step 606, the difference between the two measured reference temperatures is more than a threshold, then the operations return to step 602 where the first reference temperature is measured again. The temperature difference threshold may be predefined or specified by a user. If the reference temperature difference is less than the threshold, then the operations proceed to step 608, where the stable reference temperature is sent to the electronic corrector 104.

The field tester 108 may receive confirmation of the received reference temperature from the electronic corrector 104, at step 610. The field tester 108 may indicate the success or failure of the temperature calibration in the GUI 300.

Referring to FIG. 6B, the method 620 begins at step 622 where the field tester 108 measures the reference pressure. The field tester 108 may use the reference pressure sensor 204 to measure the reference pressure.

The field tester 108 measures the reference pressure again, at step 624. If, at step 626, the difference between the two measured reference pressures is more than a threshold, then the operations return to step 622 where the first reference pressure is measured again. The pressure difference threshold may be predefined or specified by a user. If the reference pressure difference is less than the threshold, then the operations proceed to step 628, where the stable reference pressure is sent to the electronic corrector 104.

The field tester 108 may receive confirmation of the received reference pressure from the electronic corrector 104, at step 630. The field tester 108 may indicate the success or failure of the pressure calibration in the GUI 300.

Figure 7:
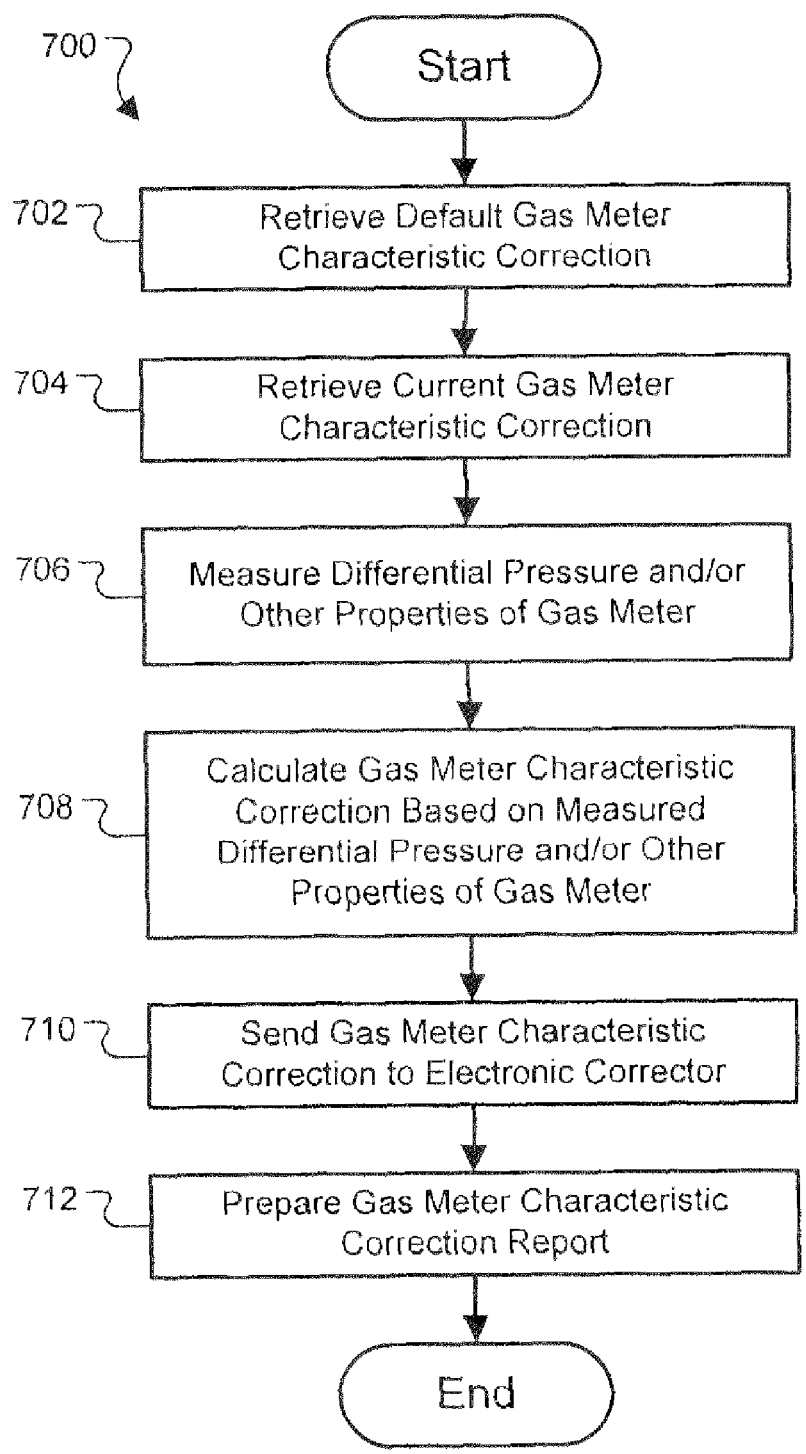
FIG. 7 is a flow chart that illustrates an exemplary method for updating a meter characteristic in an electronic corrector.

FIG. 7 shows a flow chart illustrating an exemplary method 700 for correcting the gas meter characteristic correction, which is used by the electronic corrector 104 to adjust the output pulses from the gas meter 102. The method 700 includes operations that may be performed generally by the field tester 108. The operations may be performed under the control, supervision, and/or monitoring of the portable computer 150. Some or all of the operations may be performed by one or more processors executing instructions tangibly embodied in a signal. The processing may be implemented using analog and/or digital hardware or techniques, either alone or in cooperation with one or more processors executing instructions.

The method 700 begins in step 702 where the field tester retrieves the default gas meter characteristic correction from the electronic corrector 104. In addition, the field tester 108 retrieves the current gas meter characteristic correction from the electronic corrector 104. The electronic corrector 104 may store the default and current gas meter characteristic corrections in the memory 123.

At step 706, the field tester 108 measures properties of the gas meter 102, such as the differential pressure across the gas meter impellers or other properties of the gas meter 102. In addition, gas meter properties may include properties of the sound produced by the gas meter 102, such as tones or changes in tones.

The field tester 108 calculates a gas meter characteristic correction, at step 708, based on the measured gas meter properties. The measured gas meter properties may correspond to a change in the adjustment of the output pulses from the gas meter 102 due to its characteristics.

The field tester 108 sends, at step 710, the calculated gas meter characteristic correction to the electronic corrector 104. The electronic corrector 104 may store the calculated gas meter characteristic correction in the memory 123.

At step 712, the field tester 108 prepares a gas meter characteristic correction report. In one implementation, the field tester 108 may present the report to a user within the user interface 222. In some implementations, the field tester 108 may output the report for viewing at an external device, such as the portable computer 150.

Although some embodiments of the method have been described, other embodiments may perform the same or substantially similar steps in a different sequence, or a modified arrangement to achieve similar functions, which include, in one embodiment, checking the operation of a gas metering system having a gas meter with a rotating flow responsive element, an electronic corrector, and a junction there between.

Although an exemplary system has been described with reference to FIGS. 1, 2A, and 2B, other implementations may be deployed in other processing applications, such as desktop and networked environments. In various embodiments, some or all of the diagnostic instrument may be implemented in a modular form factor, such as a PCMCIA card, or as a plug-in module adapted for use with a handheld computer, for example.

For example, implementations may include one or more wireless data links, such as between the field tester 108 and any of the portable computer 150, the electronic corrector 104, and/or the gas meter 102. Implementations may also include wireless data links between the field tester 108 and the portable computer 150, between the field tester 108 and the electronic corrector 104, and/or between the field tester 108 and the gas meter 102. In one implementation, the field tester 108 may have a data link with the portable computer 150 and with the electronic corrector 104. During a test, the field tester 108 may relay information between the electronic corrector 104 and the portable computer 150, for example. In various embodiments, one or more sensors (e.g., pressure, temperature, rotation) may communicate data over a wireless link to the field tester 108.

Some systems may be implemented as a computer system that can be used with embodiments of the invention. For example, various embodiments may include digital and/or analog circuitry, computer hardware, firmware, software, or combinations thereof Apparatus can be implemented in a computer program product tangibly embodied in an information carrier, e.g., in a machine-readable storage device or in a propagated signal, for execution by a programmable processor; and methods can be performed by a programmable processor executing a program of instructions to perform functions of the invention by operating on input data and generating an output. The invention can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits).

In some embodiments, the field tester 108 may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a handheld computer, laptop, desktop computer or a server.

In some embodiments, one or more user-interface features may be custom configured to perform specific functions. The invention may be implemented in a computer system that includes a graphical user interface and/or an Internet browser. To provide for interaction with a user, some embodiments may be implemented on a computer having a display device, such as a CRT (cathode ray tube) or LCD (liquid crystal display) monitor for displaying information to the user, a keyboard, and a pointing device, such as a mouse or a trackball by which the user can provide input to the computer.

In various embodiments, the system 100 may communicate using suitable communication methods, equipment, and techniques. For example, the system 100 may communicate with compatible devices (e.g., devices capable of transferring data to and/or from the system 100) using point-to-point communication in which a message is transported directly from the source to the receiver over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other embodiments may transport messages by broadcasting to all or substantially all devices that are coupled together by a communication network, for example, by using omni-directional radio frequency (RF) signals. Still other embodiments may transport messages characterized by high directivity, such as RF signals transmitted using directional (i.e., narrow beam) antennas or infrared signals that may optionally be used with focusing optics. Still other embodiments are possible using appropriate interfaces and protocols such as, by way of example and not intended to be limiting, USB 2.0, Firewire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In one aspect, a method to update characteristic information for a gas meter operating to measure gas in a gas line includes receiving a measurement of a parameter in a gas meter. The method also includes determining a flow rate of gas through the gas meter while the parameter was being measured. The method further includes determining a gas meter characteristic based on the measured parameter and the determined flow rate.

In various embodiments, the determined gas meter characteristic may correspond to a difference between a response of the gas meter and an ideal response. Determining the gas meter characteristic may include determining an adjustment that substantially linearizes the response of the gas meter. The measured parameter may include a differential pressure across the meter, and the differential pressure measurement may be taken from between an inlet and an outlet of the gas meter. The measured parameter may include a vibration, and the method may further include performing spectral analysis to quantify the vibration. The method may involve a sensor to detect vibrations associated with misoperation of the gas meter, and misoperation of the meter may be associated with a bearing in the gas meter.

Determining the flow rate may include checking that the flow rate before and after the parameter is measured are substantially similar, or verifying that the flow rate is substantially stable. The method may further include storing the determined gas meter characteristic in a data storage device, and the data storage device may be operably coupled to an electronic corrector for the gas meter The method may also include sending the determined gas meter characteristic to an electronic corrector coupled to the gas meter. The parameter may be measured while the gas meter is in service and operating to measure gas being transported in a gas line.

In another aspect, a method relates to checking the operation of a gas metering system having a gas meter with a flow responsive element, an electronic corrector, and a junction there between. The method includes receiving a reference volume signal from a sensor to detect motion of a flow responsive element within a gas meter in a gas meter system. The method also includes receiving a measured volume signal from an electronic corrector coupled to the gas meter. The method further includes comparing the measured volume signal to the reference volume signal to check operation of a portion of the gas meter system.

In various embodiments of the method, the portion of the gas meter that is checked may include a junction that couples the gas meter to the electronic corrector The measured volume signal may be a high frequency (HF) type signal. The portion of the gas meter that is checked may further include a processor in the electronic corrector that executes instructions to generate the measured volume signal that is adjusted to substantially correct for error characteristics of the gas meter based on stored characteristic information about the gas meter. The measured volume signal may be uncorrected.

The measured volume signal may be processed to substantially correct for one or more measured conditions of gas in the meter. The measured volume signal may be a corrected volume signal. The measured conditions may include a gas temperature and/or a line pressure.

The portion of the gas meter that is checked may include a processor in the electronic corrector to execute instructions to generate the measured volume signal that is adjusted to substantially correct for the measured condition. The operation of the gas meter is checked while the gas meter is in service and operating to measure gas being transported in a gas line.

Receiving a reference volume signal may include receiving an uncorrected reference volume signal and receiving a corrected reference volume signal. Receiving a measured volume signal from the electronic corrector coupled to the gas meter may include receiving an uncorrected measured volume signal and receiving a corrected measured volume signal. Comparing the measured volume signal to the reference volume signal may include comparing the uncorrected reference volume signal to the uncorrected measured volume signal, and comparing the corrected reference volume signal to the corrected measured volume signal.

The portion of the gas meter that is checked may include a junction that couples the gas meter to an electronic corrector. The portion of the gas meter that is checked may further include a processor in the electronic corrector to execute instructions to generate the measured volume signal that is adjusted to substantially correct for error characteristics of the gas meter based on stored characteristic information about the gas meter. The portion of the gas meter that is checked may include a processor in the electronic corrector to execute instructions to generate the measured volume signal that is adjusted to substantially correct for one or more measured conditions of the gas in the meter if the corrected reference volume signal differs from the corrected measured volume signal by more than a selected threshold. The measured conditions may include a gas temperature and/or a pressure of the gas in the meter.

The gas meter may be a positive displacement-type meter in which the flow responsive element may include an impeller, or a diaphragm. The flow responsive element may include a turbine.

A number of implementations of the invention have been described. Nevertheless, it will be understood that various modifications may be made without departing from the spirit and scope of the invention. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method to update characteristic information for a gas meter operating to measure gas in a gas line, the method comprising:
   measuring, by a portable diagnostic device, a parameter indicative of performance degradation of a gas meter, wherein the parameter is measured using one or more sensors that are part of the portable diagnostic device;
   determining, by the portable diagnostic device, a flow rate of gas through the gas meter while the parameter is being measured, wherein the flow rate is determined using, at least, a temperature parameter and a pressure parameter, measured by sensors that are part of the gas meter, and wherein service of the gas meter is not significantly interrupted or stopped while the parameters or the flow rate are being determined;
   determining, by the portable diagnostic device, a gas meter characteristic based on the measured parameter and the determined flow rate, wherein the gas meter characteristic defines a relationship between motion of a flow-responsive element in the gas meter to an error in the volume measured by the gas meter; and
   updating an electronic corrector coupled to the gas meter to use the determined gas meter characteristic.

2. The method of claim 1, wherein determining the gas meter characteristic comprises determining an adjustment that substantially linearizes the response of the gas meter.

3. The method of claim 1, wherein the measured parameter comprises a differential pressure across the meter.

4. The method of claim 1, wherein the measured parameter comprises a vibration.

5. The method of claim 1, further comprising sending the determined gas meter characteristic to an electronic corrector coupled to the gas meter.

6. The method of claim 5, further comprising adjusting by the electronic corrector a measured volume signal for the error rate of volume transported by the gas meter by applying the determined gas meter characteristic to the measured volume signal.

7. The method of claim 1, wherein the parameter is measured while the gas meter is in service and operating to measure gas being transported in a gas line.

8. The method of claim 1, further comprising determining the gas meter characteristic when the parameter deviates from an expected value for the determined flow rate.

9. A method to update characteristic information for a gas meter operating to measure gas in a gas line, the method comprising:
   measuring, by a portable diagnostic device, a parameter indicative of performance degradation of a gas meter, wherein the measured parameter comprises a differential pressure across the gas meter, and wherein the parameter is measured using one or more differential pressure sensors that are part of the portable diagnostic device;
   determining, by a portable diagnostic device, a flow rate of gas through the gas meter while the parameter is being measured, wherein the flow rate is determined using, at least, a temperature parameter and a pressure parameter, measured by sensors that are part of the gas meter, and wherein service of the gas meter is not significantly interrupted or stopped while the parameters or the flow rate are being determined;
   determining, by the portable diagnostic device, a gas meter characteristic based on the measured parameter and the determined flow rate, wherein determining the gas meter characteristic comprises determining an adjustment that substantially linearizes the response of the gas meter, wherein the gas meter characteristic defines a relationship between motion of a flow-responsive element in the gas meter to an error in the volume measured by the gas meter; and
   updating an electronic corrector coupled to the gas meter to use the determined gas meter characteristic.

10. The method of claim 9, wherein the measured parameter comprises a vibration.

11. The method of claim 9, further comprising sending the determined gas meter characteristic to an electronic corrector coupled to the gas meter.

12. The method of claim 11, further comprising adjusting by the electronic corrector a measured volume signal for the error rate of volume transported by the gas meter by applying the determined gas meter characteristic to the measured volume signal.

13. The method of claim 9, wherein the parameter is measured while the gas meter is in service and operating to measure gas being transported in a gas line.

14. The method of claim 9, further comprising determining the gas meter characteristic when the parameter deviates from an expected value for the determined flow rate.

15. A method to update characteristic information for a gas meter operating to measure gas in a gas line, the method comprising:
   measuring, by a portable diagnostic device, a parameter indicative of performance degradation of a gas meter, wherein the measured parameter comprises a vibration, and wherein the parameter is measured using one or more vibration sensors that are part of the portable diagnostic device;
   determining, by a portable diagnostic device, a flow rate of gas through the gas meter while the parameter is being measured, wherein the flow rate is determined using, at least, a temperature parameter and a pressure parameter, measured by sensors that are part of the gas meter, and wherein service of the gas meter is not significantly interrupted or stopped while the parameters or the flow rate are being determined;
   determining by the portable diagnostic device a gas meter characteristic based on the measured parameter and the determined flow rate, wherein determining the gas meter characteristic comprises determining an adjustment that substantially linearizes the response of the gas meter, wherein the gas meter characteristic defines a relationship between motion of a flow-responsive element in the gas meter to an error in the volume measured by the gas meter; and updating an electronic corrector coupled to the gas meter to use the determined gas meter characteristic.

16. The method of claim 15, further comprising sending the determined gas meter characteristic to an electronic corrector coupled to the gas meter.

17. The method of claim 16, further comprising adjusting by the electronic corrector a measured volume signal for the error rate of volume transported by the gas meter by applying the determined gas meter characteristic to the measured volume signal.

18. The method of claim 15, wherein the parameter is measured while the gas meter is in service and operating to measure gas being transported in a gas line.

19. The method of claim 15, further comprising determining the gas meter characteristic when the parameter deviates from an expected value for the determined flow rate.

* * * * *